(12) United States Patent
Tournois et al.

(10) Patent No.: US 11,859,926 B2
(45) Date of Patent: Jan. 2, 2024

(54) SEALING DEVICE FOR A MOTOR VEHICLE HEAT EXCHANGER

(71) Applicant: Valeo Systemes Thermiques, Le Mesnil Saint Denis (FR)

(72) Inventors: Rémi Tournois, Le Mesnil Saint Denis (FR); Fabien Bireaud, Guyancourt (FR); Stephan Andre, Le Mesnil Saint-Denis (FR); Emmanuel Henon, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 96 days.

(21) Appl. No.: 17/414,620

(22) PCT Filed: Dec. 2, 2019

(86) PCT No.: PCT/FR2019/052885
§ 371 (c)(1),
(2) Date: Jun. 16, 2021

(87) PCT Pub. No.: WO2020/128195
PCT Pub. Date: Jun. 25, 2020

(65) Prior Publication Data
US 2022/0049907 A1 Feb. 17, 2022

(30) Foreign Application Priority Data
Dec. 19, 2018 (FR) ...................................... 1873290

(51) Int. Cl.
*F28D 21/00* (2006.01)
*F28F 9/00* (2006.01)
(52) U.S. Cl.
CPC ........ *F28F 9/002* (2013.01); *F28D 2021/008* (2013.01); *F28F 2230/00* (2013.01); *F28F 2275/085* (2013.01)

(58) Field of Classification Search
CPC .. F28F 9/002; F28F 2230/00; F28F 2275/085; F28F 2280/06; F28D 2021/008
See application file for complete search history.

(56) References Cited

U.S. PATENT DOCUMENTS 5,165,251 A * 11/1992 Tsukamoto ........... F16L 55/033
285/192
6,470,961 B1* 10/2002 Case ....................... F28F 9/002
165/149

(Continued)

FOREIGN PATENT DOCUMENTS

CN          103988041 A        8/2014
DE       102015012505 A1 *    3/2017

(Continued)

OTHER PUBLICATIONS

The First Office Action issued in Chinese Application No. 201980085088.2, dated Jun. 24, 2022 (12 pages).

(Continued)

*Primary Examiner* — Devon Russell
(74) *Attorney, Agent, or Firm* — Osha Bergman Watanabe & Burton LLP (57) ABSTRACT

The invention relates to a sealing device (3) for a motor vehicle heat ex-changer (4) consisting of a plate (5) comprising a central cavity (12) configured to allow the passage of a tube of the heat exchanger, characterised in that at least two opposite end edges of said plate (5) are each provided with snap-fastening means (8), each capable of engaging with complementary snap-fastening elements integrated into a recess located in a support frame of the heat exchanger, and characterised in that the sealing device (3) comprises an elastically deformable sealing means (14) arranged around the central cavity (12) formed in the plate (5).

11 Claims, 5 Drawing Sheets

(56) References Cited

U.S. PATENT DOCUMENTS

| | | | |
|---|---|---|---|
| 8,495,835 B2* | 7/2013 | Timmons | E06B 7/32 |
| | | | 160/180 |
| 2014/0338616 A1* | 11/2014 | Foos | B60H 1/00571 |
| | | | 123/41.14 |
| 2018/0195431 A1 | 7/2018 | Yoo et al. | |

FOREIGN PATENT DOCUMENTS

| | | | | |
|---|---|---|---|---|
| EP | 1873881 A1 * | 1/2008 | | H02G 3/22 |
| EP | 2062761 A2 * | 5/2009 | | B60H 1/00528 |
| EP | 2679871 A2 * | 1/2014 | | F16L 5/10 |
| FR | 2744781 A1 * | 8/1997 | | F16L 5/10 |
| GB | 2373571 A | 9/2002 | | |
| JP | 2009262688 A * | 11/2009 | | |
| SE | 537907 C2 * | 11/2015 | | F16L 5/10 |
| WO | 2005-088225 A1 | 9/2005 | | |

OTHER PUBLICATIONS

International Search Report and Written Opinion in corresponding International Application No. PCT/FR2019/052885, dated Apr. 8, 2020 (10 pages).

* cited by examiner

SEALING DEVICE FOR A MOTOR VEHICLE HEAT EXCHANGER

The present invention relates to sealing devices, and more particularly sealing devices intended for heat exchange systems of motor vehicles, in particular hybrid or electric vehicles.

It is known practice to provide motor vehicles with various circuits for coolant or heat transfer fluid, for the cooling of various components of the vehicle and in particular the engine or the batteries, and/or to form a cooling circuit for a heating, air conditioning and/or ventilation system. These various fluid circuits have to pass through one or more heat exchangers fitted to the vehicle, in particular on the front end of the vehicle, so that the fluid circulating in the exchanger can exchange heat with a stream of air entering through the front end of the vehicle.

Such systems are used both for combustion engine vehicles and for electric or hybrid vehicles. In electric or hybrid vehicles, the current electric motorization means use increasingly powerful batteries to improve the engine performance and comfort of the vehicle, while increasing the range of the vehicle. The increase in battery power must go hand in hand with research into rapid charging means. Rapid charging stations that use electrical powers greater than 50 kW are known. With such high powers, however, there is heat dissipation in the vehicle battery, which, if not discharged, can cause irreversible damage such as a reduction in battery lifespan or a limitation of its charging speed.

In order to prevent such damage, it is necessary to thermoregulate the battery, and in particular to cool the battery. For this purpose, motor vehicles are conventionally equipped with heat exchange systems capable of transferring calories from one fluid to another. A ventilation duct is used to guide the incoming air, which is cold, to one or more heat exchangers, which can be arranged in a hermetically sealed encapsulation casing also encapsulating a motor-fan unit.

In the particular situation of rapid charging, the vehicle is stationary. In order to ensure sufficient air flow to allow optimal cooling of the battery, the motor-fan unit operates at high speeds, thereby generating a high overpressure within the casing. Such an overpressure is liable to cause leakage of fresh air, i.e. air exiting the casing without passing through the exchanger(s), and, where appropriate, recirculation of hot air coming from outside the casing, which in both cases has the effect of reducing the thermal performance of the front end module. It is thus essential that the encapsulation casing be sealed, in particular where components such as heat exchanger inlet and outlet pipes pass through the casing, as these components constitute areas of weakness which may be the source of air leakage.

To overcome this drawback, sealing devices can be used in the encapsulation casing, in the areas where the pipes pass through the casing. It should be noted that this problem is not confined to electric and hybrid vehicles, as heat transfer fluid circuits as described above may also form part of the ventilation, heating or air conditioning systems of combustion engine vehicles. However, the known devices have many disadvantages. Due to the variety of diameters and types of pipes making up heat exchange systems, these sealing devices are often difficult to adapt and must be made to specific dimensions in order to ensure optimum sealing for the pipes of varying gauge for which they are intended. Such a drawback leads to an increase in production costs, due to the multiplicity of sealing parts required for different models, as well as supply problems when it is necessary to replace the device.

In addition, such factors can interfere with the performance of the sealing device. For example, the use of sealing devices intended for pipes of a certain diameter on pipes with a similar but not identical diameter will not be optimal and will not prevent the recirculation of hot air streams and/or the leakage of fresh air. Conversely, the insertion of pipes with a slightly larger diameter in a sealing device that is too narrow can create physical stresses on the sealing device, thereby accelerating its wear and reducing its lifespan.

Another drawback found with known sealing devices is their complexity of assembly and disassembly. Many of these devices are permanently attached, especially when they require overmolding operations to ensure sealed attachment of the pipes where they pass through the encapsulation casing. Such an operation not only makes assembly complex, but also makes any subsequent disassembly, for maintenance or repair, more difficult.

The present invention falls within this context and aims to provide a durable sealing device for a heat exchanger, which can be easily adapted to the different diameters of the pipes of a front end module, and is easy to produce.

Another aim of the invention is to provide a front end module assembly method which is simple, in particular because it does not require any additional attachment operation, such as overmolding, and which also makes it possible to facilitate any subsequent disassembly, while maintaining optimum sealing of the heat exchanger encapsulation casing.

The present invention thus relates to a sealing device for a motor vehicle heat exchanger consisting of a plate comprising a central recess configured to allow a heat exchanger pipe to pass through, characterized in that at least two opposite end edges of said plate are each equipped with a snap-fastening means, each able to interact with complementary snap-fastening elements integrated in a housing located in a support frame of the heat exchanger, and characterized in that the sealing device comprises an elastically deformable sealing means, arranged around the central recess formed in the plate.

"Snap fastening" means fastening involving, on the one hand, a protrusion of material, forming a male element, and on the other hand a notch or slot, forming a female element, the protrusion being of a shape complementary to the notch, so that it can be inserted therein, this insertion being achieved by elastic deformation of one and/or the other of the male and female elements.

For the purpose of the interaction between the sealing device and the housing, said housing is integrated in the support frame of the heat exchanger, in the area where a heat exchanger pipe passes through the wall of the support frame, and has a shape complementary to that of the sealing device. Depending on the shape of said device, the housing may be surrounded by grooves, which can also interact with the sealing device.

Depending on the shape of said device, the housing may be surrounded by grooves, which can also interact with the sealing device. Thus, as explained above, it may be integrated in one of the walls of the support frame, and therefore closed on each side or, alternatively, it may be arranged such that one of the sides of the housing is located at one end of the wall of the support frame, leaving the housing open on one side. Lastly, the housing may be placed in the area of contact between the support frame and a ventilation duct, which is attached to said support frame, it being understood that in such a case, the housing is partially integrated in the support frame and partially integrated in the ventilation duct.

The sealing device and the assembly formed by the housing and the grooves thus interact so as to allow simplified insertion of the device in the front end module. Moreover, assembly of the front end module as a whole is simplified, since the heat exchanger can first be placed in its support frame, such that one or more of its pipe(s) pass through said frame in defined passage areas, the ventilation duct can be attached to the support frame, and the sealing device can be inserted at any time, depending on the installation of the heat exchanger in the front end module, either before or after attaching the ventilation duct.

No additional attachment operation is required once the sealing device has been installed in its housing, and any future handling for maintenance will be simple since the device can be removed easily. To this end, all that is required is to remove the ventilation duct, then to exert sufficient pressure on one of the faces of the sealing device, advantageously the face oriented toward the inside of the front end module, so as to disengage the snap-fastening means and thus dislodge the sealing device.

The presence of an elastically deformable sealing means arranged around the central recess formed in the plate gives the device the ability to adapt to pipes of varying gauge while ensuring optimum sealing. "Elastically deformable" means that the sealing means is made of a flexible material, capable of undergoing deformation following the application of a physical stress, such as the insertion of a pipe in said recess, and capable of returning to its position by an elastic return force so as to press against the contour of the pipe.

According to a first embodiment of the present invention, the elastically deformable sealing means may comprise a flexible sealing sheath, overmolded on the plate around the central recess, and provided with a plurality of precut zones. The sheath is initially in an unperforated, standard state, and when the front end module is assembled, it is possible to pierce, without considerable effort, a hole with a diameter tailored to the gauge of the desired pipe in the sheath. Alternatively, the sheath may be perforated by tearing, when the pipe is inserted directly in the unperforated sealing sheath. Such a sealing means ensures standardization of the sealing device, which is thus suitable for a wide range of pipes.

On the one hand, the precut zones make it possible to define cutout zones, with specific diameters, more or less equal to the desired diameter. On the other hand, the elasticity of the material forming the sheath guarantees sealing of the area where the pipe passes through, since the material conforms to its shape. The standardization of the sealing device thus contributes to reducing production costs while simplifying the assembly of the front end module. Advantageously, it also facilitates insertion of the pipe, while avoiding the concentration of stresses, whether on the sealing device or the pipes.

According to one feature of the invention, the flexible sealing sheath may comprise several plateaus arranged in series one on top of the other, said plateaus being arranged by decreasing diameter from the plate, each plateau forming a precut zone for the passage of a pipe of corresponding diameter.

According to one feature of the invention, at least the sealing sheath may be made of EPDM (ethylene-propylene-diene monomer) rubber.

According to a second embodiment, having similar advantages, the elastically deformable sealing means is made in one piece with the plate of the sealing device by at least two notches originating from the central recess, these notches delimiting deformable tabs. In other words, the elastically deformable sealing means is formed by deformable tabs arranged in the plane of extension of the plate, said deformable tabs being formed around the central recess by means of at least two notches opening into this central recess. "Deformable tabs" means areas made of a flexible material, of substantially rectangular or trapezoidal shape, two sides of which are defined by said notches, which may be deformed or moved simply by applying a physical stress, such as the insertion of a pipe, so as to adapt to different gauges of pipe.

The method for assembling the heat exchanger system is thus simplified to the maximum since the sealing device does not require any prior preparation, such as a step of cutting to a specific diameter, with a view to inserting the pipe. The presence of the deformable tabs ensures that the sealing device is adaptable to different pipe gauges without impairing sealing of the system, since, due to the flexibility of the central zone, each tab conforms to the shape of the pipe passing through.

It is thus understood that these two embodiments make it possible to adapt the sealing device to different types of pipe while limiting the variety of compatible parts necessary to ensure proper sealing of the front end module.

Likewise, the shape of the plate as described or shown in the figures is in no way limiting. Thus, the plate may have a substantially rectangular shape, or alternatively, in the case of the first embodiment, follow the contour of the sealing sheath on one of its edges.

In each of the embodiments, these sealing devices may be produced such that there is a difference in materials, and therefore in rigidity, between the snap-fastening means on the one hand, and the sealing means arranged at the central recess on the other. For example, the snap-fastening means may be made of a rigid material, such as polypropylene (PP) or polyamide (PA), while the sealing means will be made of more flexible materials, such as EPDM rubber.

The shape of the plate, as described or shown below, is however in no way limiting; it may thus have a substantially rectangular shape, or even have more rounded edges.

As mentioned above, the sealing device comprises, in addition to the elastically deformable sealing means, at least two snap-fastening means, each arranged on opposite end edges of the plate and each capable of interacting with additional fastening elements integrated in the heat exchanger support frame.

According to one feature of the invention, the snap-fastening means may be arranged on the face of the sealing device which will be oriented toward the inside of the front end module once the sealing device has been integrated in the system. In such a configuration, the fastening means extend perpendicular to the plane defined by the plate, over a length less than the length of the plate.

According to another feature of the invention, the snap-fastening means are each positioned on a wall arranged in the vicinity of an end edge, substantially perpendicular to the plane in which the plate and the central recess extend, the snap-fastening means extend, in a plane parallel to the plane in which the plate and the central recess extend, over a length less than the length of the corresponding end edge of said plate. The fastening means according to the present configuration extend over a length less than the length of the side edge of said plate. The snap-fastening means may be arranged on the side walls, more particularly on the face of said side wall oriented toward the outside of the part.

According to one feature of the invention, the plate is surrounded by a peripheral zone offset axially and forming a platform, the plate and the peripheral zone being connected by side walls. Note that the axis along which the plate and the peripheral zone are offset is the axis perpendicular to the plane in which the plate and the central recess extend. The plate and the peripheral zone are connected by side walls which may extend in a plane orthogonal to that of the plate.

According to one feature of the invention, the peripheral zone extends in a plane parallel to the plane in which the plate and the central recess extend, and in which the end of the peripheral zone opposite the side walls is equipped with a section of material, orthogonal to the plane of said peripheral zone, forming a return wall arranged in such a way that the return walls, the peripheral zone and the side walls form a clearance zone housing the snap-fastening means. This clearance zone reinforces the sealing of the system at the fastening means, acting as an obstacle for any air leakage. The clearance zone, in the form of a channel, may for example have a U-shaped or J-shaped profile, sized to accommodate the snap-fastening means.

When the sealing device comprises such return walls, the housing of complementary shape will also be equipped with at least two grooves, able to accommodate the return walls, said grooves extending parallel to the housing over a length greater than the length of the housing, so as to surround same.

The return walls thus help to lock the sealing device by abutting against complementary shaped grooves accommodating them, so as to prevent any movement within the housing. By virtue of their arrangement, the peripheral zone, the side walls, and the return walls, forming the clearance zone, create an additional barrier at the snap-fastening means, thus reinforcing the sealing thereof.

According to one feature of the invention, the snap-fastening means are arranged on the return walls, on a face oriented toward the side wall, so that the snap-fastening means extend into the clearance zone.

Note that for each embodiment and configuration presented, the complementary snap-fastening elements and means have either the structure of a protruding (male) element or the structure of an element forming a slot (female), suitable for interacting with said protrusion, one and/or the other being elastically deformable to facilitate this snap-fastening. One of these elements is arranged within the sealing device, while the complementary element is arranged within the support frame of the heat exchanger, in the housing or the grooves surrounding same, according to the configuration considered for the fastening means. Thus, and according to one feature of the present invention, the protruding (male) element may be integrated in the sealing device, while the complementary (female) slots are integrated in the support frame, or vice versa. Such fastening contributes to the simplification of the assembly of the front end module and makes the sealing device advantageously removable for any maintenance operation.

The snap-fastening means are configured such that the male element is housed in the female element by elastic deformation of one or the other, and such that at least one of these male and female elements comprises a bulge forming a stop to combat disengagement of these elements from one another.

The present invention also relates to a front end module comprising at least one heat exchanger provided with one or more pipe(s), a support frame for the exchanger, at least one ventilation duct configured to interact with said frame, at least one sealing device according to one of the embodiments of the present invention and an associated housing of complementary shape, equipped with snap-fastening means, referred to as complementary fastening elements, capable of interacting with snap-fastening means present in the sealing device, said housing being integratable in the support frame or in the assembly formed by the support frame and the ventilation duct, when the latter are assembled so as to adopt a "closed" configuration. Depending on the shape of the sealing device of the present invention, the housing of complementary shape may also be surrounded by at least two grooves, able to accommodate the return walls of the sealing device, said grooves extending parallel to the housing over a length greater than the length of the housing.

"Closed configuration" means that the ventilation duct is fastened on the support frame, such that the rear face of the ventilation duct is in contact with the front end face of the support frame of the exchanger, so to enclose the heat exchanger(s) in a sort of encapsulation casing. The ventilation duct, which is open toward the front of the vehicle at an inlet conduit that may be fitted with grilles, thus directs the incoming fresh air toward the rear face of the ventilation duct and hence toward the heat exchangers, when the duct is fastened to the support frame.

When the heat exchanger is placed in the support frame, its incoming and outgoing pipe(s) are passed through a wall of the support frame. The housing of complementary shape, intended to accommodate the sealing device, is located in the area where these inlet or outlet pipes for heat exchanger fluids pass through the support frame.

Said housing may be arranged so as to be positioned entirely in the support frame, all its sides being closed or it may, alternatively, have an open side in the extension of the side wall of the support frame. In particular, the housing may extend both in the support frame and in the ventilation duct.

In the case of this alternative, the rim of the ventilation duct which is attached to the support frame should have a cavity capable of accommodating at least part of the sealing device. Likewise, when the housing is open and there is contact between at least one side edge of the sealing device and the ventilation duct, said duct participates in locking the sealing device within the housing, the front end module is arranged such that the side edge of the sealing device located at the opening of the reception housin, bears on the rim of the ventilation duct which is attached to the support frame.

According to various features of the invention, taken alone or in combination, it may be provided that:

the front end module for a motor vehicle comprises at least one heat exchanger provided with one or more pipes, a support frame configured to allow attachment of the heat exchanger, a ventilation duct configured to interact with a front end face of said support frame and configured to guide air toward the heat exchanger, and at least one sealing device as described above, the front end module further comprising a housing formed in a wall of the support frame in the passage areas where the heat exchanger fluid inlet or outlet pipe passes through, said housing having a shape and dimensions at least partially complementary to those of the sealing device, the housing being equipped with complementary snap-fastening elements able to interact with the snap-fastening means present in the sealing device.

the housing of complementary shape is closed on all of its sides, such that none of the sides of the sealing device is in contact with the ventilation duct when the latter is attached to the support frame.

the housing being surrounded by at least two grooves, able to accommodate the return walls of the sealing device, said grooves extending parallel to the housing over a length greater than the length of the housing.

The invention also relates to a method for assembling a front end module for a motor vehicle equipped with a sealing device as described above, the method comprising a first step of placing the heat exchanger in the support frame, a second step of fastening the sealing device, by insertion on the pipe of the heat exchanger until the sealing device is placed in the complementary housing, and a third step of locking the front end module by attaching the ventilation duct to the support frame.

Further features, details and advantages of the invention will become more clearly apparent from reading the following detailed description, and from studying several exemplary embodiments that are given purely by way of nonlimiting indication, with reference to the attached schematic drawings, in which.

Figure 1:
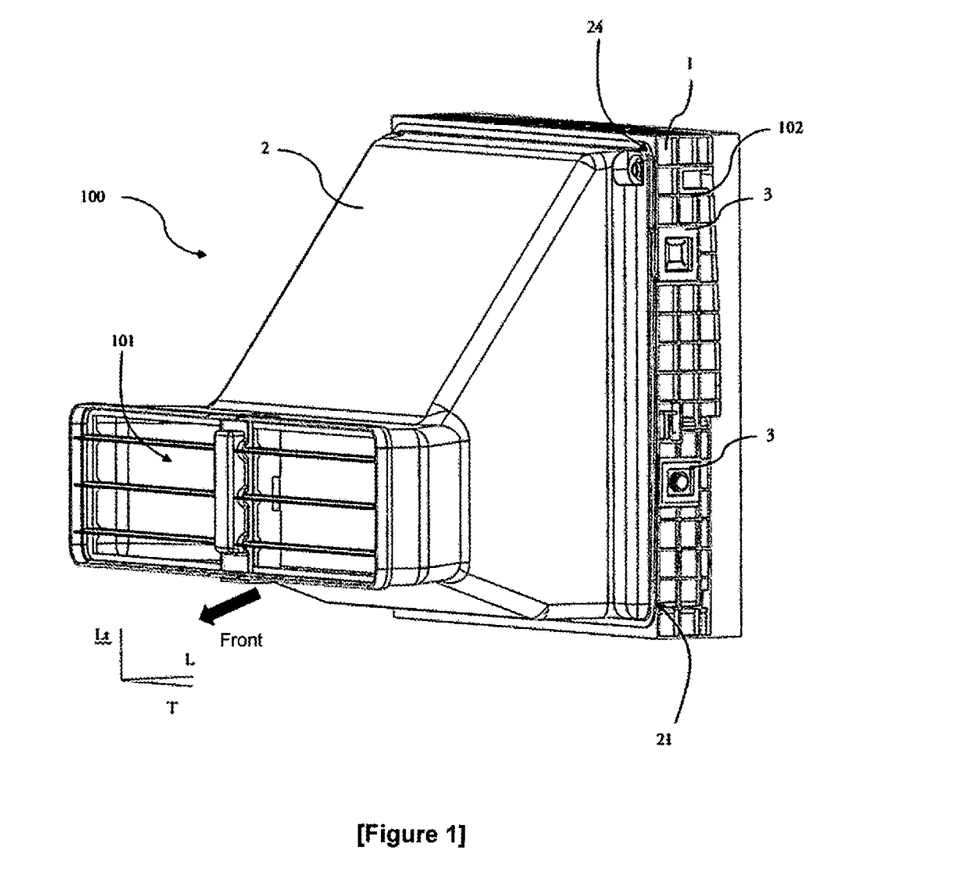
FIG. 1 is a schematic perspective view of a front end module according to one aspect of the invention, in the closed configuration, in which a ventilation duct is fastened to a support frame housing at least one heat exchanger (not shown here), FIG. 1 showing, in a purely illustrative, nonlimiting manner, two different embodiments of a sealing device according to the invention.
Figure 2:
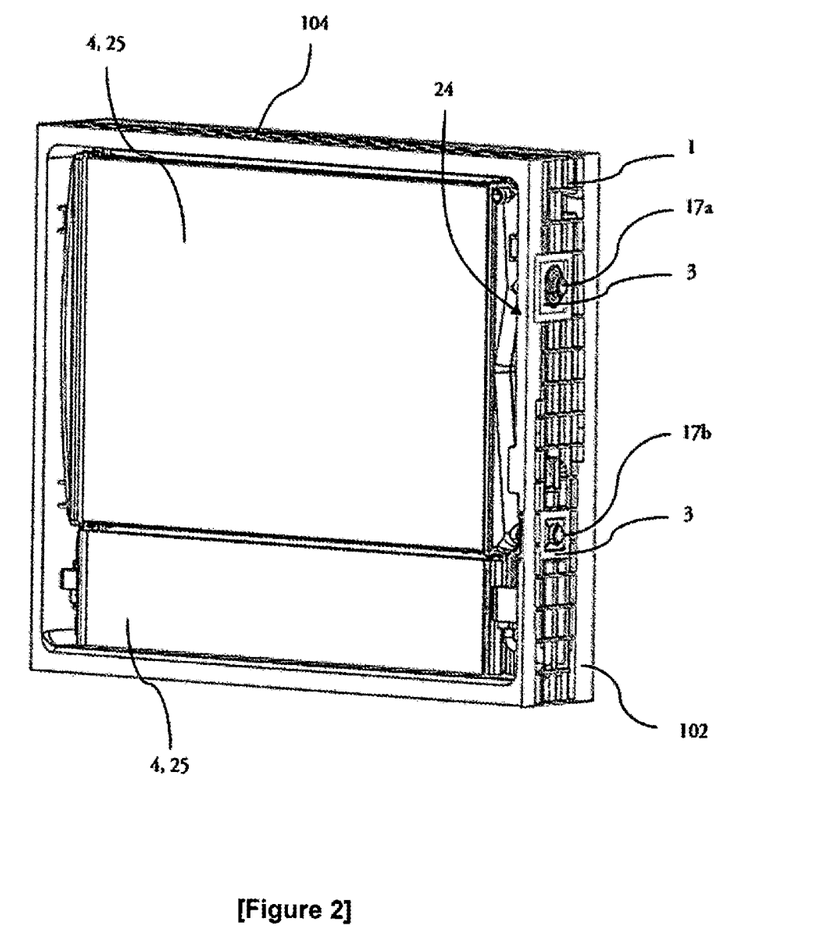
FIG. 2 is a schematic perspective view of the front end module shown in FIG. 1, when in the open configuration, with the ventilation duct removed to free up the interior of the support frame and make the heat exchanger(s) housed therein accessible.

A front end module 100 according to the present invention comprises at least one heat exchanger 4 provided with one or more pipes 17a, 17b, a support frame 1 for the heat exchanger 4, at least one ventilation duct 2 configured to interact with said frame and guide fresh air toward this frame and to force through the heat exchanger, at least one sealing device 3 arranged around a pipe in a passage area where the pipe passes through a wall of the support frame, and an associated housing 10 with a shape complementary to that of the sealing device 3, wherein the housing 10 may be formed in the support frame 1 or in the assembly formed by the support frame 1 and the ventilation duct 2, corresponding to a flow duct for an air stream, when the latter are assembled so as to adopt a "closed" configuration, thus forming an encapsulation casing. The support frame 1, also referred to as a holder frame, corresponds to a rigid structure, more specifically to a rigid plastic frame with four members delimiting a surface within which the heat exchanger 4 and possibly a motor-fan unit are arranged. In order to ensure the continuity of the flow duct 2, said ventilation duct 2 is attached to the support frame 1 in a sealed fashion. In other words, the holder frame ensures the continuity of the ventilation duct 2 or, in other words, the holder frame corresponds to part of the flow duct 2.

Below, and as shown on the trihedrons in the figures, a longitudinal axis L will be defined as an axis parallel to the main direction of circulation of the air stream through the support frame and each heat exchanger, and the lateral Lt and transverse T orientations will be defined as orientations perpendicular to the longitudinal axis.

Such a system 100 is shown in particular, schematically, in FIG. 1 and FIG. 2 in closed and open configuration, respectively. The heat exchanger(s) 4 are housed in the support frame 1, which is configured to allow the attachment of the ventilation duct 2.

The ventilation duct 2 has an air vent 101 open on the front end of the motor vehicle, thus allowing the entry of a fresh air stream which it redirects in the encapsulation, toward the heat exchanger 4. This ventilation duct has, at an end opposite the air vent, a rear end face, brought into contact, in the closed configuration shown in FIG. 1, with the support frame 1.

The support frame 1 comprises two side walls 102 and two transverse walls 104, which define an open frame for accommodating, between the walls, one or more heat exchangers 4. A front end face 24 of the support frame is defined as being the face intended to be in contact with the ventilation duct 2, and more particularly with the rear end face of this ventilation duct. It is through this front end face 24 that, in the example shown, the fresh air is brought into the frame to pass through the exchangers.

Each heat exchanger comprises an exchange surface 25 and at least one collector box arranged laterally with respect to this exchange surface, as well as at least one inlet 17a and outlet 17b pipe coming from the collector box and ensuring the circulation of a coolant. The coolant is caused to exchange calories with the air passing through the exchange surface.

The pipes 17a, 17b protrude from the collector box of the exchanger, substantially in the main plane of extension of the exchanger, that is to say perpendicular to the side walls defining the frame. As a result, the pipes, allowing the connection of the exchanger to a coolant circuit not shown here, are arranged so as to pass through the support frame 1 in the passage areas 26 defined when the exchanger is assembled on the frame.

In order to ensure the sealing of the encapsulation of the front end module and thus prevent any leakage of fresh air, i.e. prevent air from exiting the casing without passing through the heat exchanger or exchangers 4, or any recirculation of hot air from outside the casing to the inside thereof, which would in both cases be detrimental to the thermal performance of the front end module 100, the system is equipped with at least one sealing device 3 in the passage areas 26 where the inlet 17a and outlet 17b pipes of each heat exchanger 4 pass through the support frame 1. This sealing device 3 will be described in more detail later in the description.

For illustrative purposes, FIG. 1 and FIG. 2 show two of the embodiments of the sealing device 3 of the present invention, when they are integrated in a suitable front end module. The invention is nevertheless in no way limited to this example of use, and, for reasons relating to production costs, the same embodiment of the sealing device 3 could be implemented at the incoming 17a and outgoing 17b pipes of the heat exchanger 4.

The sealing device 3 according to the present invention consists of a plate 5 allowing a pipe 17 of the heat exchanger 4 to pass through, said sealing device 3 being able to interact with a housing 10 located in the support frame 1 of the heat exchanger 4.

The sealing device 3 is characterized in that it comprises at least two snap-fastening means 8, able to interact with complementary fastening elements 9 integrated in the support frame 1 of the heat exchanger 4, and in that the sealing device 3 comprises an elastically deformable sealing means 6, 13, arranged at a central recess 12 formed in the plate 5.

Figure 10:
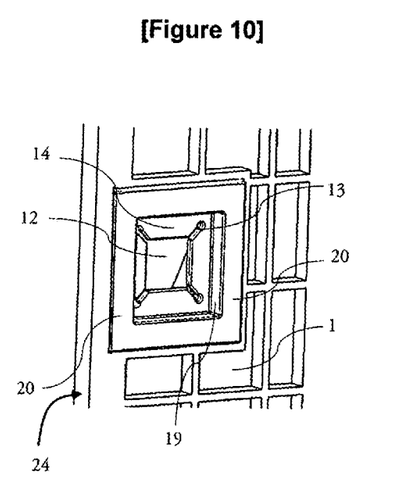
FIG. 10 schematically shows the interaction between the sealing device of FIG. 7 and the associated complementary housing of FIG. 9.
Figure 11:
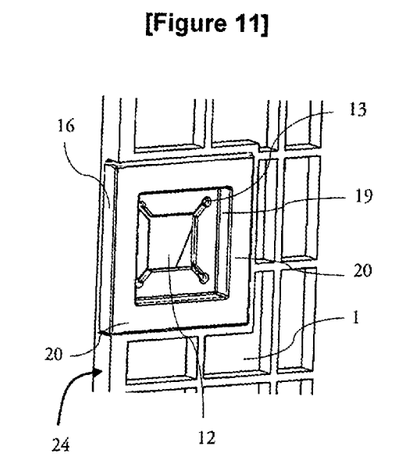
FIG. 11 schematically shows interaction similar to that of FIG. 10 according to an alternative embodiment in which the housing is open on one side.

This sealing device 3 is intended to be inserted in the housing 10 as shown in FIG. 10 or FIG. 11, said housing 10 being located in a passage area where a pipe passes through a wall of the support frame 1. The snap-fastening means 8, integrated in the sealing device 3, interact with the complementary snap-fastening elements 9, integrated in the support frame 1, and more particularly in the housing 10 or in grooves 11 surrounding this housing 10.

For each pair made up of a snap-fastening means 8 and a complementary fastening element 9, intended to interact with one another, one consists of a male element forming a protrusion, while the other consists of a female element of corresponding shape to that of the protrusion, for example a slot.

Figure 3:
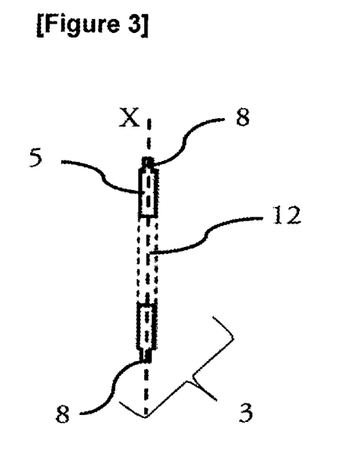
FIG. 3 schematically shows a cross section through the sealing device of the present invention, according to a first embodiment.

FIG. 3 shows a first embodiment of the sealing device 3, which consists in particular of a plate 5 extending, when the sealing device is mounted in the housing around the appropriate pipe, in a plane defined by the longitudinal axis and by the lateral axis, parallel to the main plane of extension of the side wall of the frame in which the housing of the sealing device is formed.

The plate 5 has a central recess 12, capable of allowing the pipe 17 of the exchanger to pass through, and it participates in forming or supporting an elastically deformable sealing means 13 dimensioned to be engaged around the pipe and to seal this passage area 26.

The plate 5 is also equipped with at least two snap-fastening means 8 protruding from the plate 5, arranged on opposite end edges of the plate 5 and located in the main plane of extension X of said plate 5. These protruding snap-fastening means 8 extend over a dimension smaller than that of the plate 5 and are configured to interact with complementary snap-fastening elements 9 forming slots, as will be described in detail below, located in the support frame 1, more precisely in the housing 10.

Alternatively, the arrangement of the male and female elements forming the snap-fastening means could be reversed, and a plate 5 equipped with slots could be provided while the support frame 1 contains protrusions of complementary shape and dimensions.

In an alternative not shown, provision could be made for the snap-fastening means 8 of this first embodiment to be arranged at 90° relative to the configuration shown and to extend from an end edge of the plate, substantially perpendicular to the main plane of extension X of the plate. Here again, the fastening means 8 extend over a dimension less than the length of the plate.

Figure 4:
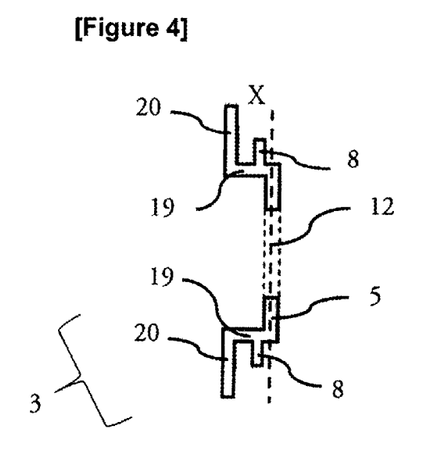
FIG. 4 schematically shows a cross section through the sealing device of the present invention, according to a second embodiment.
Figure 5:
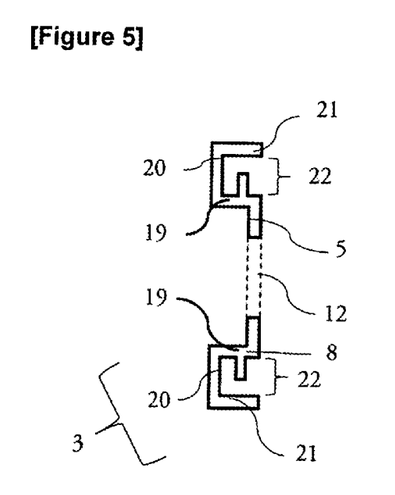
FIG. 5 schematically shows a cross section through the sealing device of the present invention, according to a third embodiment.

FIG. 4 and FIG. 5 show alternative embodiments of the sealing device.

In a second embodiment, shown schematically in FIG. 4, the sealing device 3 has a more complex arrangement: the sealing device comprises a plate 5, surrounded by a peripheral zone 20, which is axially offset so as to form a platform arranged in a separate plane parallel to the plane X defined by the plate 5. The plate 5 and the peripheral zone 20 are connected by side walls 19 extending in a plane orthogonal to that of the plate 5.

The sealing device 3 comprises at least two snap-fastening means 8, each being arranged on a side wall 19. As shown, these fastening means may more particularly be arranged on an external face of this side wall, that is to say a face of the side wall oriented toward the outside of the part or, in other words, facing away from the plate 5. Thus, the snap-fastening means 8 are compact at the central recess 12 or the plate 5, and therefore where the pipes 17 pass through.

The fastening means 8 according to the present configuration extend in a plane parallel to the plane X of the plate 5, over a length less than the length of the side edge of said plate 5. As shown, the snap-fastening means 8 integrated in the sealing device 3 take the form of protrusions, and therefore form the male snap-fastening element. They are thus configured to interact with complementary snap-fastening elements 9 integrated in the support frame 1, and more particularly in the housing 10, taking the form of slots. As specified above, the reverse configuration can nevertheless be envisaged, so that the sealing device 3 comprises the snap-fastening means 8 forming slots, and the support frame 1 integrates the protruding fastening means.

According to a third embodiment, shown in particular in FIG. 5, FIG. 6, FIG. 7 and FIG. 8, each distal end of the peripheral zone 20 is equipped with a section of material, orthogonal to the plane of said zone, forming a return wall 21. It is understood that the distal end of the peripheral zone is the end opposite the side wall which it extends perpendicularly. The assembly comprising the return walls 21, the peripheral zone 20 and the side walls 19 forms a clearance zone 22, comparable to a channel in which the various snap-fastening means 8 are arranged, so as to reinforce the sealing of the sealing device 3 at its fastening means 8.

For this third embodiment, the fastening means can again adopt different configurations. According to a first configuration, shown in FIG. 5 and FIG. 6, the snap-fastening means 8 are arranged on the side walls 19 so as to extend in a plane parallel to the plane X defined by the plate 5, and be housed within the channel formed by the clearance zone 22.

According to an alternative configuration, the snap-fastening means 8 have the same features, but this time are each arranged on a return wall 21, from an internal face thereof extending in the opposite direction to what is shown in FIG. 5, so as to be again housed within the clearance zone 22, and extend toward the plate 5.

Alternatively, the snap-fastening means 8 of the sealing device 3 may protrude from the external faces of the return walls so that they are not housed in the clearance zone 22 and extend in a plane parallel to the plane X defined by the plate 5 in the direction away from said plate 5.

As has already been mentioned, for each of the configurations described for this third embodiment, the snap-fastening means 8, integrated in the sealing device, may have the male form of a protrusion or female form of a slot, while the complementary snap-fastening element 9 will have the opposite shape.

In all of the above, and below, note that the term "slot" means both blind holes comprising an end wall against which or facing which the protrusion comes, and holes passing through the wall in which these slots are formed.

Figure 9:
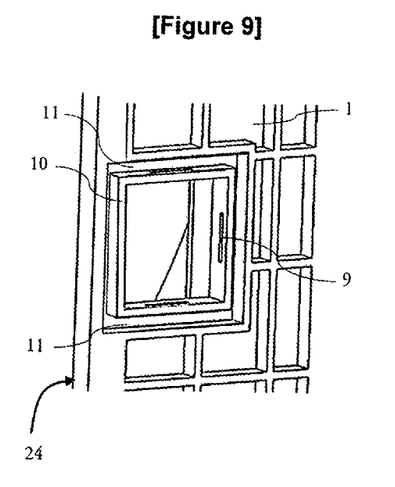
FIG. 9 schematically shows the housing and grooves, arranged in the support frame, and able to interact with the sealing device of the present invention, according to the third embodiment.

When the sealing device 3 comprises, in accordance with this third embodiment, such return walls 21, the housing 10 of complementary shape has a particular shape, visible in particular in FIG. 9.

The housing 10 is surrounded by at least two grooves 11, able to accommodate the return walls 21, which will be discussed in more detail below. Thus, the plate 5 of the sealing device 3 interacts with the housing 10, while the return walls 21 interact with the grooves 11.

The return walls 21 thus help to lock the sealing device 3 by abutting against grooves 11 accommodating them, so as to prevent any movement, in the plane X defined by the plate 5, within the housing 10.

FIG. 10 and FIG. 11 show the interaction between the sealing device 3, when it is produced according to the third embodiment, and the housing 10 associated therewith.

The particular arrangement of said housing 10 is more apparent in FIG. 9, in the absence of the sealing device 3. The housing 10 presented takes the form of a window, formed in a side wall 102 of the support frame 1, encircling a cavity arranged so as to allow a pipe 17 to pass through when the heat exchanger 4 is inserted in the support frame 1. Below, the various faces of this window will be referred to as "sides of the housing" 10. The cavity, which forms a passage area 26 as mentioned above, thus allows on the one hand the passage of a pipe and on the other hand the integration of the sealing device 3.

Whatever the embodiment considered, the housing 10 is arranged so as to adopt a shape complementary to that of the sealing device 3. More particularly, the sides of the housing 10 must be able to interact with the shape of the plate 5 so that, when the sealing device 3 is inserted in the housing 10, the sides of said housing 10 surround the plate 5. For more complex embodiments, such as the second or third embodiment, comprising side walls 19, the sides of the housing 10 are in contact with the side walls 19.

According to the configurations adopted for the snap-fastening means 8 of the sealing device 3, the complementary fastening elements 9 are integrated on the sides of the housing 10. This is for example the case for any configuration in which the snap-fastening means 8 are integrated in the side walls 19.

In the third embodiment of the sealing device 3, the sealing device 3 comprises return walls 21. In order to be able to accommodate these return walls in the volume defined by the support frame 1, the housing 10 is surrounded, on at least two sides, by grooves 11 of a shape complementary to the shape of said return walls 21. These grooves 11 thus form a receiving rail for the return walls 21, extending parallel to the housing 10 over a length greater than the length of the housing, so as to be able to surround the latter.

In the case shown in FIG. 10, the housing 10 is closed by four sides of the housing and it is completely encircled by grooves 11 which define a closed periphery.

According to an alternative, shown in FIG. 11, the housing 10 is produced by a notch formed in a wall of the support frame, in this case a side wall 102, from the front end face 24. The housing again has a shape and dimensions complementary to those of the sealing device 3, more particularly to those of the plate 5. In other words, the housing 10 is open on at least one side, so that it opens onto the front end face 24 of the support frame 1. As will be described below, the housing is thus intended to be closed, once the sealing device has been inserted, by pressing the ventilation duct 2 on the support frame 1 when the system is in the closed configuration.

In such an alternative, the grooves 11 are also open on at least one side. More particularly, the grooves are open at a longitudinal end so as to open onto the front end face 24 of the wall of the support frame. As shown, the grooves 11 are arranged on either side of the housing 10 and they open onto the same face as the opening of the housing.

The grooves thus extend from the end of the side wall of the support frame 1 to beyond the periphery of the housing 10. A side edge 16 of the sealing device, located on the open side of the housing 10, is arranged in the extension of the front end face 24 of the wall of the support frame 1, when the sealing device 3 is assembled in the housing 10. The side edge 16 of the sealing device thus forms an area of contact with the ventilation duct 2, and more particularly the rear end face of this ventilation duct 2, when the front end module is in the closed configuration and the ventilation duct is attached to the support frame 1. Thus, when the ventilation duct 2 is attached to the support frame 1, thus forming an encapsulation casing, the rear face of the ventilation duct 2 is in continuous contact with the support frame 1/sealing device 3 assembly, thus ensuring, on the one hand, sealing of the casing, and on the other hand, locking of the sealing device 3 in its housing 10.

As described above, the plate 5 participates in forming or supporting a sealing means, which is elastically deformable, arranged at the central recess 12 in the plate 5. This sealing means, making it possible to ensure the sealing of the encapsulation casing in the passage area where the pipe 17 of the heat exchanger 4 passes through, will be described below with reference to various embodiments. It will be understood that combinations other than those shown by way of example could be implemented in the context of the invention, with sealing devices which comprise one or other of the snap-fastening means described above and one or other of the elastically deformable sealing means which will be described below.

Figure 8:
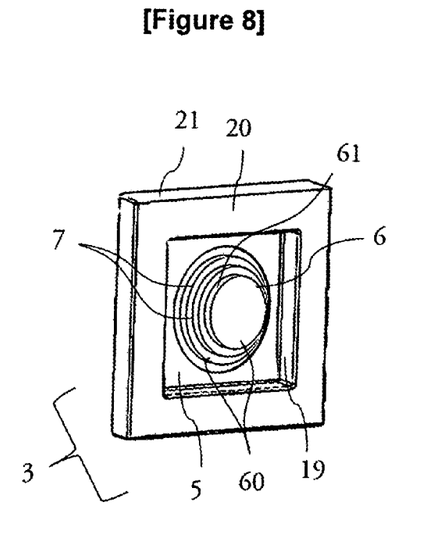
FIG. 8 is a perspective view, at an angle similar to that of FIG. 7, of the sealing device of the present invention, when this device comprises a second type of sealing means.

In a first embodiment, shown schematically in FIG. 8, the elastically deformable sealing means comprises a flexible sealing sheath 6, overmolded on the plate 5 around the recess 12 in its central zone. Said sealing sheath 6 is provided with a plurality of precut zones 7, each precut zone 7 corresponding to a different gauge of pipe. This particular feature makes it possible to facilitate assembly of the sealing device with the pipes 17 of the heat exchanger 4, and to use a standard sealing part for several sizes of pipes.

The production of the elastically deformable sealing means in the form of a flexible sheath, with precut zones, makes it possible either to perforate the sealing sheath to the desired diameter before inserting the pipe 17, or to perforate the sealing sheath directly by tearing the precut zone as a result of the physical stress exerted by the pipe on the unperforated sealing sheath.

In the example shown, the various precut zones are formed by the arrangement of the flexible sealing sheath 6 with a diameter which decreases in the direction away from the plate and by the arrangement of fragile zones along the flexible sheath, each fragile zone location corresponding to the cutout of the sheath to correspond to a pipe of given diameter. More particularly, the sealing sheath may have a series of plateaus 60 the diameters of which decrease in the direction away from the plate, with each plateau, substantially parallel to the plane defined by the plate, connected to a neighboring plateau by a connecting ring 61 substantially perpendicular to the plateau(s). The junction of such a connecting ring with a plateau 60 forms a right angle facilitating the detachment of the plateau having dimensions corresponding to those of the pipe to be inserted.

In such an embodiment, at least the sealing sheath 6 should be made of a flexible material, such as EPDM. In an alternative, the plate 5 and the snap-fastening means 8 will be made of a more rigid material capable of withstanding greater stresses, such as polyamide PA66, where appropriate reinforced with glass fibers, while the sealing sheath, over-molded on the plate around the central recess 12, will be made of EPDM.

The flexibility of the material forming the sealing sheath allows it to deform as the pipe passes through, the elastic nature of this material helping to press the sheath around the pipe as it passes through, so as to seal the passage area. The elastic return to position of the material forming the sealing sheath can also make it possible to interact with an anti-disengagement stop means formed on the pipe.

Figure 6:
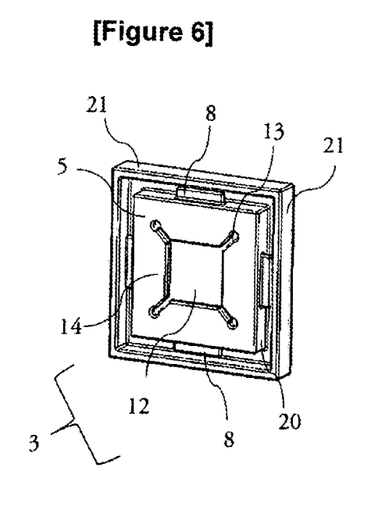
FIG. 6 is a perspective view of the sealing device of the present invention, according to the third embodiment, seen from the rear of the device.
Figure 7:
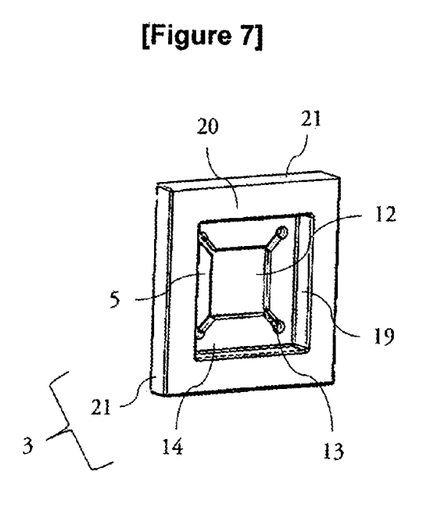
FIG. 7 is a perspective view of the sealing device of FIG. 6, seen from the front of the device.

In a second embodiment, shown in FIG. 6 and FIG. 7 for example, the plate 5 participates in forming in its plane of extension the elastically deformable sealing means. This is formed in one piece with the plate 5, by at least two notches 13 extending from the central recess 12 toward the edges of the plate 5. These notches 13 make it possible to form deformable tabs 14, each of substantially trapezoidal shape, over the entire contour of the recess zone 12, thus making the sealing device 3 suitable for accommodating pipes 17 of variable diameter. When a pipe 17 is inserted in such a sealing device, the deformable tabs 14 are bent as the pipe passes through and the elastic return to position due to their elastic nature allows these tabs to press against the pipe 17 so as to ensure sealing of the system.

Such an embodiment has, moreover, the advantage of simplifying as much as possible the assembly of the front end module since it does not require the sealing device to be cut to a specific diameter beforehand, with a view to insertion of the pipe. In such an embodiment, the sealing device 3 may be made of a single material and made of a material allowing elastic deformation of the tabs upon insertion of the pipe, such as an EPDM rubber.

A method for assembling the heat exchange system comprising a sealing device as described above, more particularly according to the third embodiment, as shown in FIG. 7 or FIG. 8, will now be described. In a first step, the heat exchanger 4 is inserted in the support frame 1, so that its incoming 17a and outgoing 17b pipes pass through the wall of the support frame 1 at the housings 10 intended to accommodate the sealing devices 3. Next, the sealing device 3 is inserted in the system by sliding along the longitudinal axis defined by the pipe, until it is inserted in the housing 10, or more precisely, in the case of a sealing device according to the third embodiment, until the return walls 21 are inserted in the grooves 11 and the plate 5 is surrounded by the housing 10, and finally the snap-fastening means 8 of the sealing device 3 interact with the complementary fastening elements 9 of the housing 10.

In the case of a sealing device 3, the sealing means of which is a sealing sheath 6, the sealing device 3 may be directly inserted on the pipe 17, so that the stress exerted by said pipe 17 perforates the sealing sheath 6 by tearing. Alternatively, the sealing sheath 6 may first be cut to the desired diameter, such a step being optional.

Lastly, the ventilation duct 2 is fastened to the support frame 1, so as to close the front end module.

The front end module 100 according to the invention may further comprise a shut-off device comprising a set of shut-off flaps capable of pivoting rotatably so as to vary the flow rate of the air stream, said shut-off device being arranged in the ventilation duct 2 upstream of the heat exchanger 4 relative to the flow of the air stream. The shut-off device further comprises a support frame having bearings so as to hold the shut-off flaps. The axes of rotation allow the shut-off flaps to switch from an open configuration to a closed configuration. The open configuration consists in placing (by rotation) the shut-off flaps so that they provide as little opposition as possible to the passage of the air stream while orienting it appropriately. The closed configuration consists in placing the shut-off flaps so that they provide, by means of their front surface, as much opposition as possible to the flow of the air stream F, in conjunction with the other shut-off flaps.

According to an embodiment of the front end module 100 that is not shown, the heat exchanger 4 and the support frame 1 may be inclined relative to the shut-off device. In other words, the mid-planes of the support frame 1 and of the shut-off device form an angle other than 0° (non-zero), particularly an angle in an interval of 10° to 80°, more specifically in an interval of 30° to 60°. Such an arrangement makes it possible to reduce the spatial footprint of the front end module 100.

It will be understood from reading the foregoing that the present invention proposes a sealing device, intended for a heat exchanger, this sealing device being configured to ensure the sealing of a front end module while facilitating its assembly and disassembly. The presence of snap-fastening means contributes to easy insertion of said device, while facilitating assembly of the front end module, while the sealing means presented ensure both optimum sealing of the system and standardization of the sealing device.

The invention is not limited to the means and configurations described and illustrated herein, however, and also extends to all equivalent means or configurations and to any technically operational combination of such means. In particular, the shapes of the snap-fastening means or the shape of the plate may be modified at no detriment to the invention, as long as they fulfill the functions described in this document.

The embodiments that are described hereinabove are thus entirely nonlimiting; it will be possible, in particular, to imagine alternative forms of embodiment of the invention that comprise only a selection of the features described below, in isolation from the other features described in this document, if this selection of features is sufficient to confer a technical advantage or to distinguish the invention from the prior art.

The invention claimed is:

1. A sealing device for a motor vehicle heat exchanger comprising:
   a rigid plate comprising a central recess configured to allow a heat exchanger pipe to pass through;
   wherein at least two opposite end edges of said rigid plate are each equipped with a snap-fastening means, each able to interact with complementary snap-fastening elements integrated in a housing located in a support frame of the heat exchanger;
   an elastically deformable sealing means arranged around the central recess formed in the rigid plate wherein a plurality of notches with rounded ends extend from a rectangular-shaped central aperture in the center of the elastically deformable sealing means toward the edges of the rigid plate.

2. The sealing device as claimed in claim 1, wherein the snap-fastening means are each positioned on a wall arranged in the vicinity of an end edge, substantially perpendicular to the plane in which the rigid plate and the central recess extend, the snap-fastening means extend, in a plane parallel to the plane in which the rigid plate and the central recess extend, over a length less than the length of the corresponding end edge of said rigid plate.

3. The sealing device as claimed in claim 1, wherein the rigid plate is surrounded by a peripheral zone offset axially and forming a platform, the rigid plate and the peripheral zone being connected by one or more side walls.

4. The sealing device as claimed in claim 3, wherein the peripheral zone extends in a plane parallel to the plane in which the rigid plate and the central recess extend, and in which the end of the peripheral zone opposite the side walls is equipped with a section of material, orthogonal to the plane of said peripheral zone, forming one or more return wall arranged in such a way that the one or more return walls, the peripheral zone and the one or more side walls form a clearance zone housing the snap-fastening means.

5. The sealing device as claimed in claim 3, wherein the snap-fastening means are arranged on the one or more side walls.

6. The sealing device as claimed in claim 4, wherein the snap-fastening means are arranged on the one or more return walls.

7. A front end module for a motor vehicle comprising:
at least one heat exchanger provided with one or more pipes;
a support frame configured to allow attachment of the heat exchanger;
a ventilation duct configured to interact with a front end face of said support frame and configured to guide air toward the heat exchanger;
at least one sealing device as required by claim 1 comprising the elastically deformable sealing means within the central recess of the rigid plate; and
a housing formed in a wall of the support frame in the passage areas where the heat exchanger fluid inlet or outlet pipe passes through, said housing having a shape and dimensions at least partially complementary to those of the sealing device, the housing being equipped with complementary snap-fastening elements able to interact with the snap-fastening means present in the sealing device.

8. The front end module for a motor vehicle as claimed in claim 7, wherein the housing of complementary shape is closed on all of its sides, such that none of the sides of the sealing device is in contact with the ventilation duct when the latter is attached to the support frame.

9. The front end module as claimed in claim 7, wherein the housing is surrounded by at least two grooves, able to accommodate one or more return walls of the sealing device, said grooves extending parallel to the housing over a length greater than the length of the housing.

10. A method for assembling a front end module for a motor vehicle as claimed in claim 7, the front end module being equipped with at least one sealing device, the method comprising:
placing the heat exchanger in the support frame;
fastening the sealing device, by insertion on the pipe of the heat exchanger until the sealing device is placed in the complementary housing; and
locking the front end module by attaching the ventilation duct to the support frame.

11. A sealing device for a motor vehicle heat exchanger comprising:
a rigid plate comprising a central recess configured to allow a heat exchanger pipe to pass through;
wherein at least two opposite end edges of said rigid plate are each equipped with a snap-fastening means, each able to interact with complementary snap-fastening elements integrated in a housing located in a support frame of the heat exchanger;
wherein the rigid plate is surrounded by a peripheral zone offset axially and forming a platform, the rigid plate and the peripheral zone being connected by one or more side walls;
wherein the peripheral zone extends in a plane parallel to the plane in which the rigid plate and the central recess extend, and in which the end of the peripheral zone opposite the side walls is equipped with a section of material, orthogonal to the plane of said peripheral zone, forming one or more return wall arranged in such a way that the one or more return walls, the peripheral zone and the one or more side walls form a clearance zone housing the snap-fastening means; and
an elastically deformable sealing means arranged around the central recess formed in the rigid plate wherein a plurality of notches with rounded ends extend from a rectangular-shaped central aperture in the center of the elastically deformable sealing means toward the edges of the rigid plate.

* * * * *